United States Patent
Eslambolchi et al.

(10) Patent No.: US 8,606,821 B1
(45) Date of Patent: Dec. 10, 2013

(54) METHOD AND APPARATUS FOR CONSOLIDATING CALL DATA RECORDS

(75) Inventors: Hossein Eslambolchi, Los Altos Hills, CA (US); John McCanuel, Bailey, CO (US); Paritosh Bajpay, Edison, NJ (US); Monowar Hossain, Middletown, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 937 days.

(21) Appl. No.: 11/321,040

(22) Filed: Dec. 30, 2005

(51) Int. Cl.
*G06F 17/30* (2006.01)

(52) U.S. Cl.
USPC ............................ 707/796; 707/756; 379/126

(58) Field of Classification Search
USPC ................................. 707/796, 756; 379/126
See application file for complete search history.

(56) References Cited

U.S. PATENT DOCUMENTS

| | | | | |
|---|---|---|---|---|
| 5,774,532 A | * | 6/1998 | Gottlieb et al. | 379/112.01 |
| 6,002,753 A | * | 12/1999 | Morrison et al. | 379/112.01 |
| 6,016,343 A | * | 1/2000 | Hogan et al. | 379/242 |
| 6,633,555 B1 | * | 10/2003 | Lin et al. | 370/331 |
| 6,654,451 B1 | * | 11/2003 | Ward | 379/114.24 |
| 7,035,619 B1 | * | 4/2006 | Fargano et al. | 455/406 |
| 7,231,024 B2 | * | 6/2007 | Moisey et al. | 379/126 |
| 2002/0001375 A1 | * | 1/2002 | Alcott et al. | 379/126 |
| 2002/0009182 A1 | * | 1/2002 | Perkins, III | 379/114.01 |
| 2002/0103899 A1 | * | 8/2002 | Hogan et al. | 709/224 |
| 2002/0176547 A1 | * | 11/2002 | Jones | 379/88.17 |
| 2003/0076936 A1 | * | 4/2003 | Locke et al. | 379/112.01 |
| 2003/0105864 A1 | * | 6/2003 | Mulligan et al. | 709/225 |
| 2007/0078859 A1 | * | 4/2007 | Arnold | 707/10 |

* cited by examiner

*Primary Examiner* — Debbie Le

(57) ABSTRACT

An arrangement compensates for the fact that multiple entities may generate distinct call data records for the same call. In the arrangement a consolidated call data records database receives multiple call data records and analyzes them to determine which, if any, are related to the same call. Where multiple call data records are discovered to be associated with the same call the consolidated database links those call data records.

6 Claims, 2 Drawing Sheets

METHOD AND APPARATUS FOR CONSOLIDATING CALL DATA RECORDS

BACKGROUND

The invention generally relates to accurate call data record-keeping operations in a telecommunications environment. More specifically the invention relates to a process of consolidating all separately generated call detail records associated with a given call such as a telephone call.

In conventional telecommunications, networks, particularly, in those involving some sort of telephony such as is in a voice over interne protocol (VoIP) communication arrangement, it is common for each call that is set up in the arrangement to initiate the generation of a new call detail record. Each call detail record contains parameters relating to a given call. Such parameters may include things as the origin terminus of the call, the destination terminus of the call, the start time of the call, the end time of the call, an information about the links and/or nodes which make up the call connection to establish the call, etc. Additional parameters maybe associated with the given call detail record where such metrics are easily detected within the network in question and affiliated with the given call. These call detail records therefore provide a detailed set of characteristics which describe the essential aspects of the call from the service providers perspective. Call detail records can be used in connection with such processes as facilities resource management, billing, etc.

Call detail records are also useful in connection with providing an overall perspective of the quality of the service being provided to the customers of the service provider. In addition, this can be an important indicator to the service provider as to either areas within the service or service backbone which require either immediate attention, such as for the treatment of an existing fault, or failure within the service or network or alternatively, proactive treatment of service or network component aspects of the arrangement.

In certain situations within the known communications arrangements, multiple call detail records may actually be produced in connection with attempts to set up the same call. An example of this is illustrated in FIG. 1.

In this arrangement 100, an origin device may seek to communicate with a user at destination 1 (155). The origin device (110) interacts with a network element 115 within network 170. As the caller attempts to establish the call through the network element 115, a call data record 1 is generated (116). Since the call is intended for destination 1 (155), network element 115 attempts to establish the call through network elements 125 and 150 respectively. It may happen that the user at destination (155) may operate to attempt to transfer the call to a user at destination 2 (145); the transfer of the call is delineated by the dashed lines which show that the call is being transferred via network elements 150, 125 and 140 to destination 2 (145). Thus, the origin device (110) is now connected via network elements 115 and 125 and 140 to destination 2. However, for purposes of the perspective of origin device (110), this constitutes the same call. Nonetheless, because the network element 125 has been prompted to reroute or switch the call to destination 2 via the transfer operation requested by destination 1, that network element 125 generates its own call detail record, too (126). These two call detail records CDR1 and CDR2 are provided to respective call detail record databases 120 and 130. Thus, in the prior art, multiple call detail records may be generated in connection with the establishment of the same call from an origin device perspective and those multiple CDRs may be transferred to distinct databases. In this case then, the system does not have the capability of providing an accurate reflection of the user experience by the user of origin device 110 as the two separate aspects of the single call are treated as two separate events in two distinct databases. It would be beneficial to provide an arrangement whereby the service provider can have a more complete and accurate view of the user experience of the user of origin device 110.

SUMMARY

According to an embodiment of the invention a system forwards all call detail records to a consolidated call detail record database. The database processes the received call detail records to determine those records that are all associated with, or were generated during, the same call. All such records identified as being related in this manner are linked so as to create a consolidated call detail record for a given call.

DETAILED DESCRIPTION

In accordance with an arrangement provided for the invention, all of the call detail records from respective network elements can be forwarded to a consolidated call detail record (CDR) database. The consolidated CDR database analyzes all of the received CDRs and determines which CDRs are associated with one another and are related to the same call, if any. Where two or more CDRs are identified as being associated with the same call, the consolidated CDR database can process the multiple CDRs to create a single consolidated CDR which includes all of the necessary information to more completely and accurately reflect the call experience associated with the call that the multiple CDRs are related to.

Figure 1:
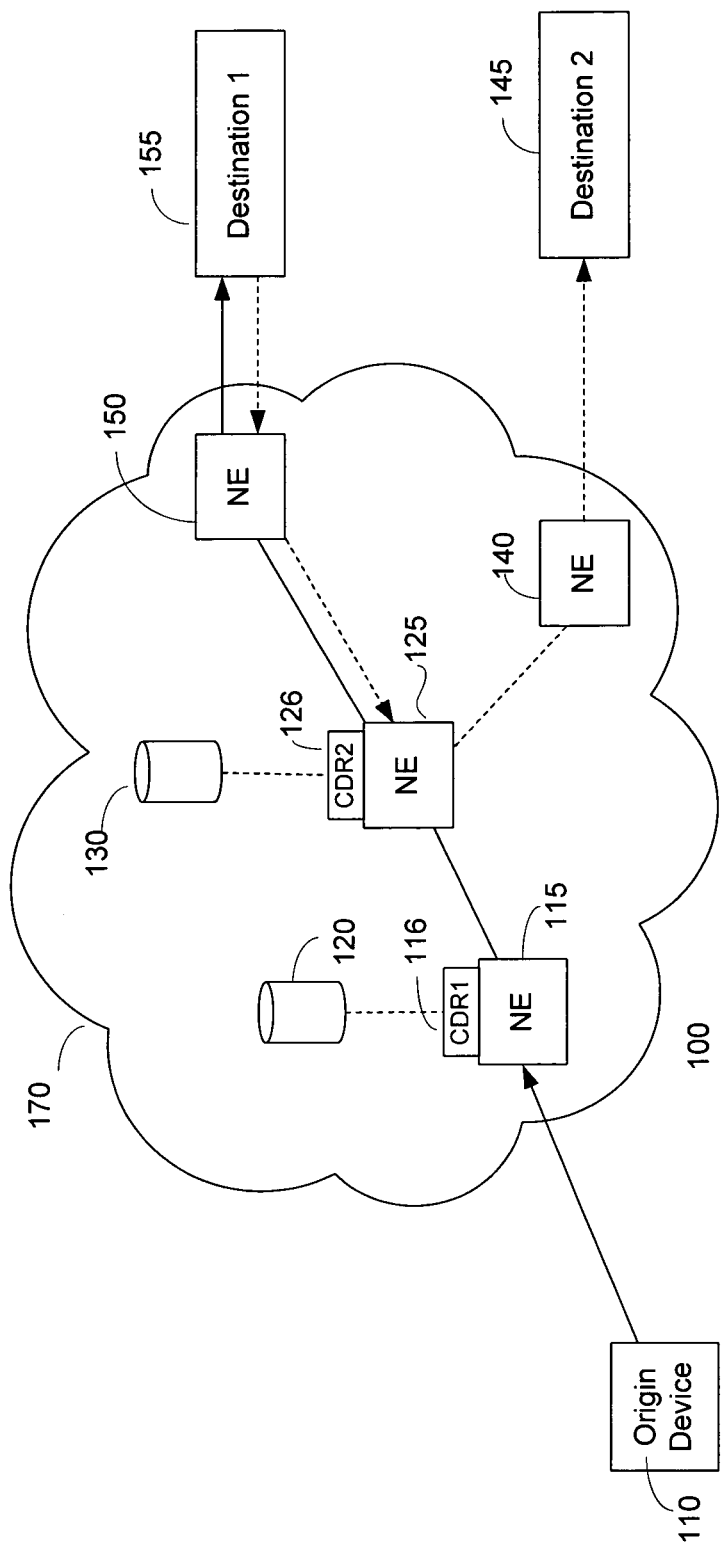
FIG. 1 illustrates an arrangement known in the art.
Figure 2:
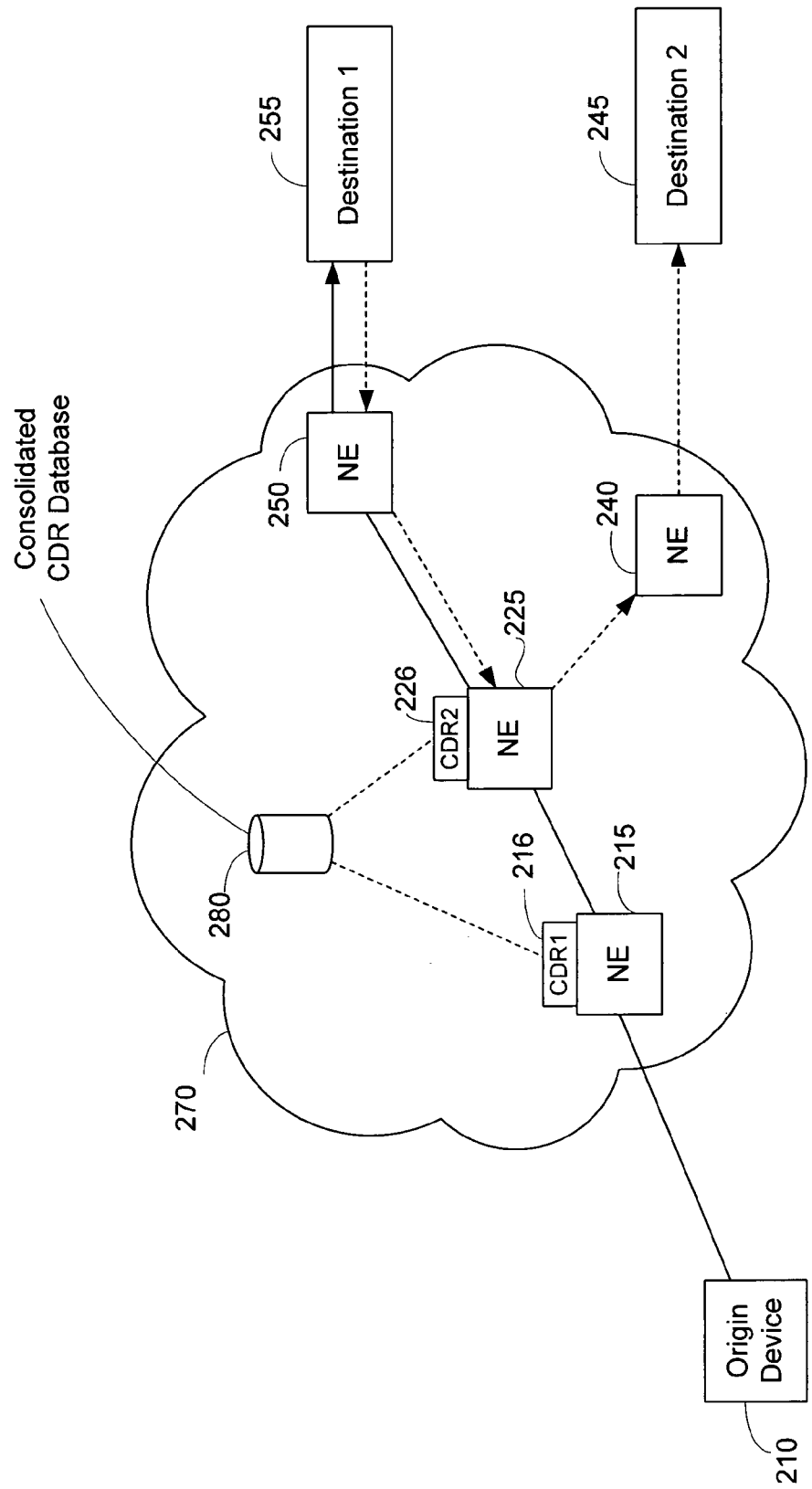
FIG. 2 illustrates an embodiment of the present invention.

FIG. 2 illustrates an arrangement in which an embodiment of the present invention is used. In this arrangement, there is similarity to the arrangement in the prior art. However, the systems differ in one key respect. Mainly, whereas in FIG. 1 the disparate yet related CDR1 and CDR2 are sent to separate data bases and never correlated, in the invention, the related CDRs generated by separate network elements 215 and 225, are presented together to a consolidated CDR database which can then operate to discern the relationship between these respective CDRs.

More particularly, in the embodiment in FIG. 2, a user at origin device 210 initiates a call intended for destination 1, 255. The call is set up via network elements 215, 225, and 250. A call detail record 1 is generated, 216, which describes this call using some or all of the call detail record characteristics described above.

At some point the call is transferred from destination 1 to destination 2 via network elements 250, 225 and 240, as represented by the dashed lines shown in FIG. 2. The consequence of this transfer operation an additional CDR is generated, CDR2.

In connection with an embodiment of the present invention, CDR1 and CDR2 are both transferred to a consolidated CDR database 280. The consolidated CDR database takes the multiple CDRs received from respective network elements within network 270 and analyzes and/or sorts through the call data records in an attempt to discover if for any given call set up through the network there are two or more related call data records. Thus for the example shown in FIG. 2, the consolidated CDR database would review the CDRs received from the respective network elements 215 and 225 (of course it is possible that network elements 250, 240 and other network elements may also forward other CDRs relating to the same or other cars to the consolidated CDR database). The consolidated CDR database is equipped with sufficient processing power and program rules and instructions to perform a search or sort through the plurality of received CDRs. In the searching or sorting operation, the database correlates or links any two or more CDRs which are found to relate to the same call established in the network. Using this criteria, then CDR1 and CDR2 would be determined to be related to one another because they both relate to the same call initiated by the user of origin device 210. The consolidated CDR database would then link these two CDRs for either later processing or for further processing at that time.

The further processing of the two or more linked CDRs could include a process by which information about the call to which the multiple CDRs relate, is extracted from the multiple CDRs and used to construct a new single CDR reflective of the entirety of the call experience as it relates to the call initiated by the user of origin device 210. As a consequence, the consolidated CDR is a much more accurate and complete reflection of the call that actually transpired from the user at origin device 210s perspective. In addition to providing the user experienced viewpoints with regard to the entirety of the call, a more complete CDR provides a more complete factual and call characteristic basis for providing additional call tracking functions (e.g., billing functions) and service provisioning and/or maintenance functions among other capabilities of interest to the service provider depending upon the call characteristics within one or more call detail records.

Therefore, in accordance with an embodiment of the present invention, a consolidated CDR database which may have additional processing functionality in the form of one or more central processing units having their own or associated memory with programs for controlling the operations of the processing units, operate to sort through call detail records received from multiple call detail record sources such as multiple network elements (e.g., gateways, switches, etc.) within a given service provider network. The arrangement thus allows for a process of searching through the multiple records to discern relationships between records that suggest two or more records from multiple network elements are actually associated with the same call. This information can then be used to create a more complete record reflective of the characteristics of the call as well as allow for the creation of a consolidated call record which is a more complete record with regard to this particular caller user experience with regard to a single call initiated via a given origin device.

CONCLUSION

While various embodiments of the invention have been described above, it should be understood that they have been presented by way of example only, and not limitation. For example although the above methods are shown and described above as a series of operations occurring in a particular order, in some embodiments, certain operations can be completed in a parallel fashion. In other embodiments, the operations can be completed in an order that is different from that shown and described above.

What is claimed is:

1. A method, comprising:
   receiving at a first database a first call detail record containing information associated with a first call between a first telephony device and a second telephony device at a first destination;
   receiving at the first database a second call detail record containing information associated with a second call from the second telephony device at the first destination to a third telephony device at a second destination, wherein the second call is generated when the first call is transferred;
   storing the first and second call detail records in the first database; and
   associating via a central processing unit of the first database the first call detail record with the second call detail record based upon a relationship that the first call detail record and the second call detail record are related to the first call initiated by the first telephony device even though the first call detail record has a different calling party and a different called party than the second call detail record.

2. The method of claim 1 wherein associating includes linking the first and second call detail records.

3. The method of claim 1 wherein associating includes generating a consolidated call detail record using the first and second call detail records.

4. A method comprising:
   receiving a plurality of call detail records;
   storing the plurality of call detail records in a database;
   sorting the plurality of call detail records to identify all of the received call detail records for each of a plurality of individual calls indicated in the plurality of call detail records where at least two distinct call detail records are associated with a same call, wherein a first one of the at least two distinct call detail records is generated containing information about a first call between an a first telephony device and a second telephony device at a first destination and a second one of the at least two distinct call detail records is generated containing information about a second call between the second telephony device at the first destination to a third telephony device at a second destination, wherein the second one of the at least two distinct call detail records is generated when the first call is transferred; and
   linking via a central processing unit of the database the first one of the at least two distinct call detail records and the second one of the at least two distinct call detail records based upon a relationship that the first call detail record and the second call detail record are related to the first call initiated by the first telephony device even though the first call detail record has a different calling party and a different called party than the second call detail record.

5. A method for processing data associated with a call transferred from a first destination to a second destination, the method comprising:
   receiving a first call detail record containing information associated with a first call between a first telephony device and a second telephony device at a first destination;
   receiving a second call detail record containing information associated with a second call between a second telephony device at the first destination to a third telephony device at a second destination, wherein the second call detail record is generated when the first call is transferred;
   storing the first and second call detail records in a database;
   analyzing the first and second call detail records;
   determining that the first call detail record and the second call detail record are associated with a same call initiated by the origin device; and
   linking via a central processing unit of the database the first call detail record with the second call detail record based upon a relationship that the first call detail record and the second call detail record are related to the first call initiated by the first telephony device even though the first call detail record has a different calling party and a different called party than the second call detail record.

6. The method of claim 5 further comprising:

generating a consolidated call detail record using the linked first and second call detail records.

\* \* \* \* \*